Figure 1:
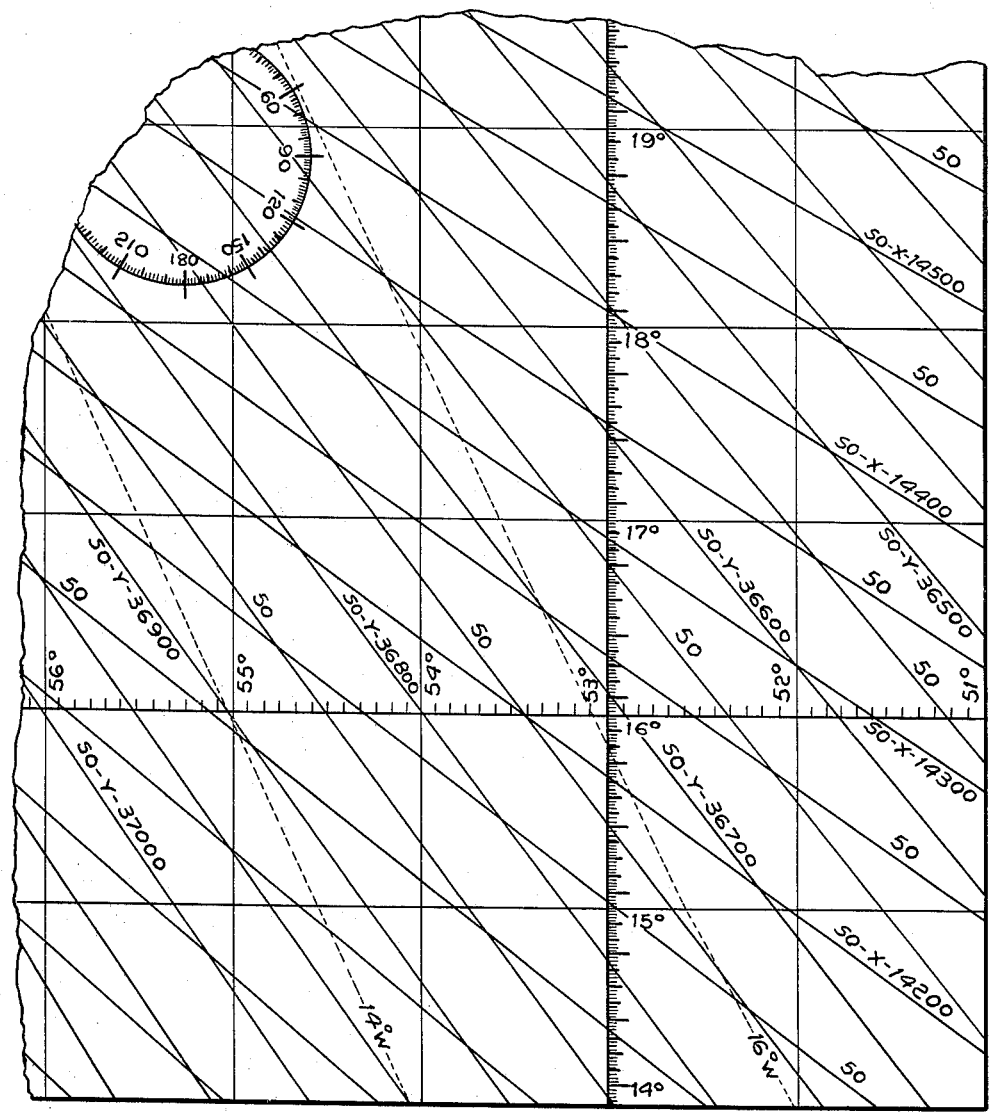

Aug. 17, 1965   C. J. PASQUIER ETAL   3,201,793
COORDINATE CONVERSION DEVICE
Filed June 20, 1962   6 Sheets-Sheet 1

INVENTORS.
CLAUDE J. PASQUIER
BY FREDRICK T. GUTMANN

ATTORNEY

INVENTORS.
CLAUDE J. PASQUIER
FREDRICK T. GUTMANN
BY
ATTORNEY

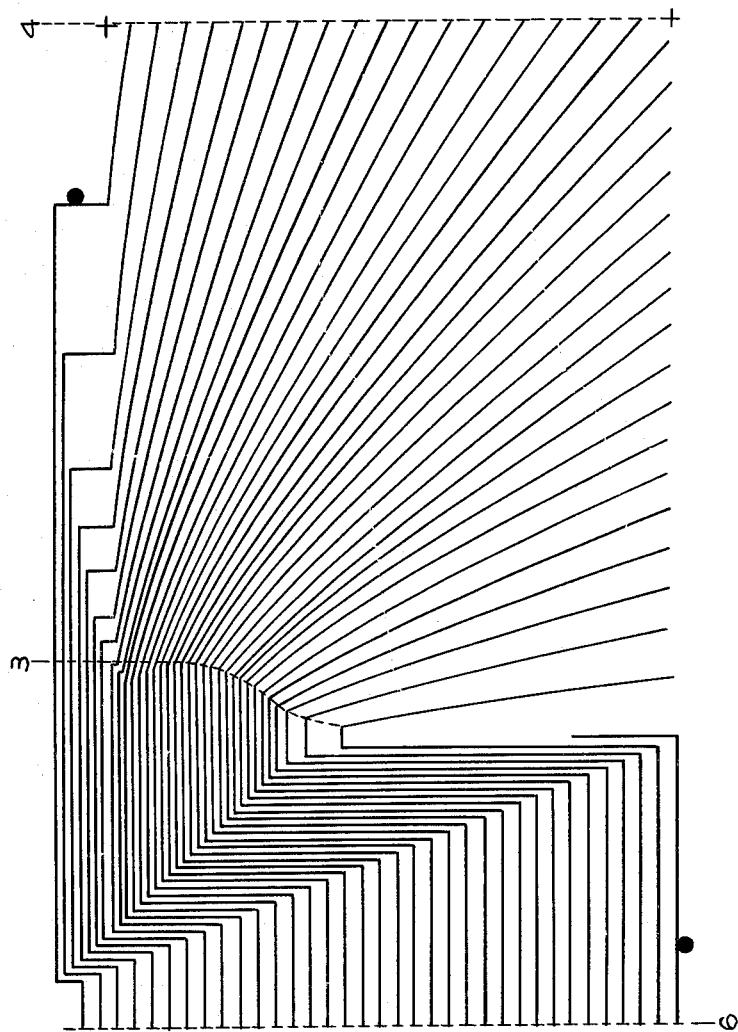

Aug. 17, 1965   C. J. PASQUIER ETAL   3,201,793
COORDINATE CONVERSION DEVICE
Filed June 20, 1962   6 Sheets-Sheet 4
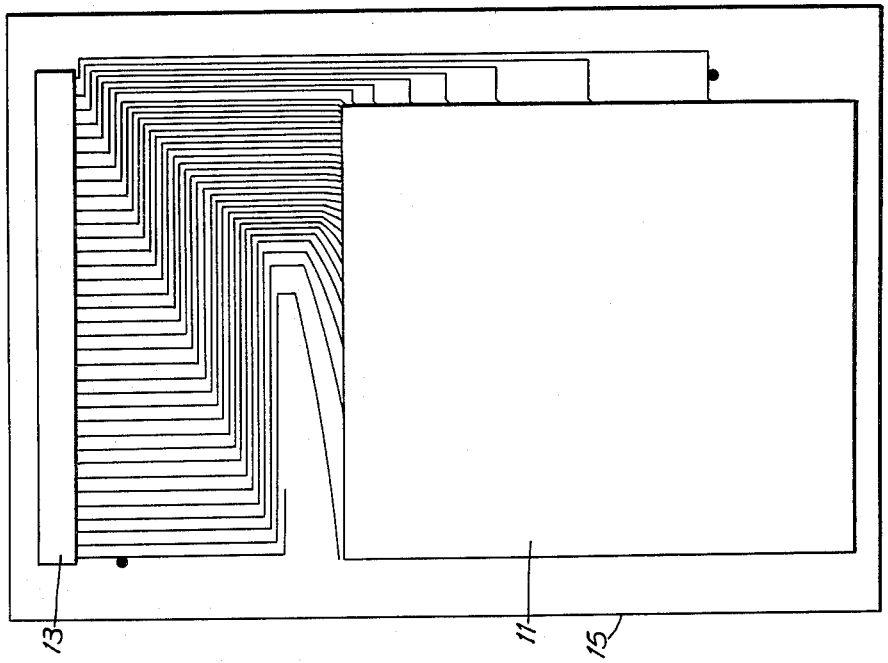
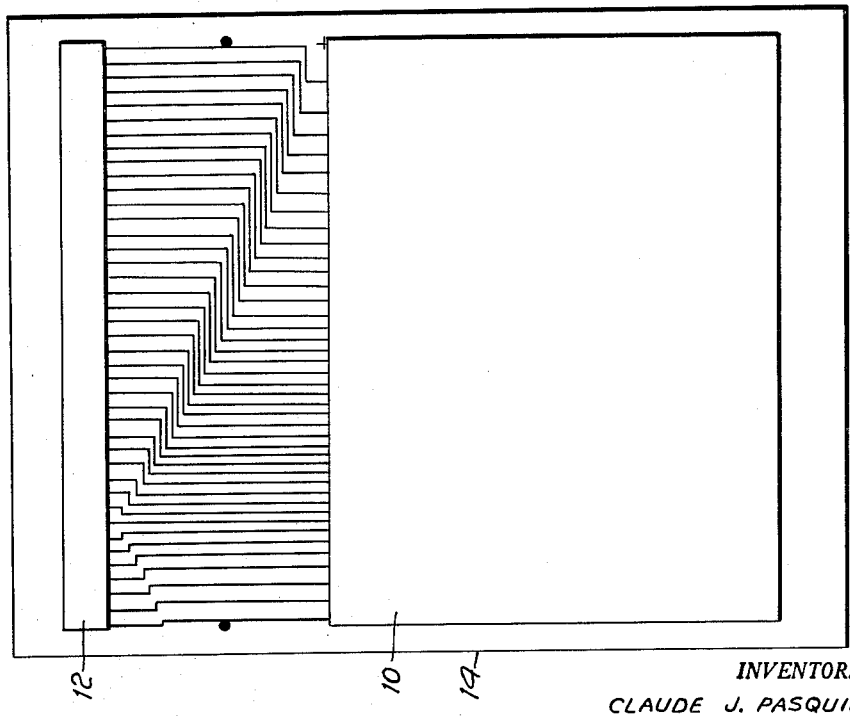
INVENTORS.
CLAUDE J. PASQUIER
BY FREDRICK T. GUTMAN
ATTORNEY

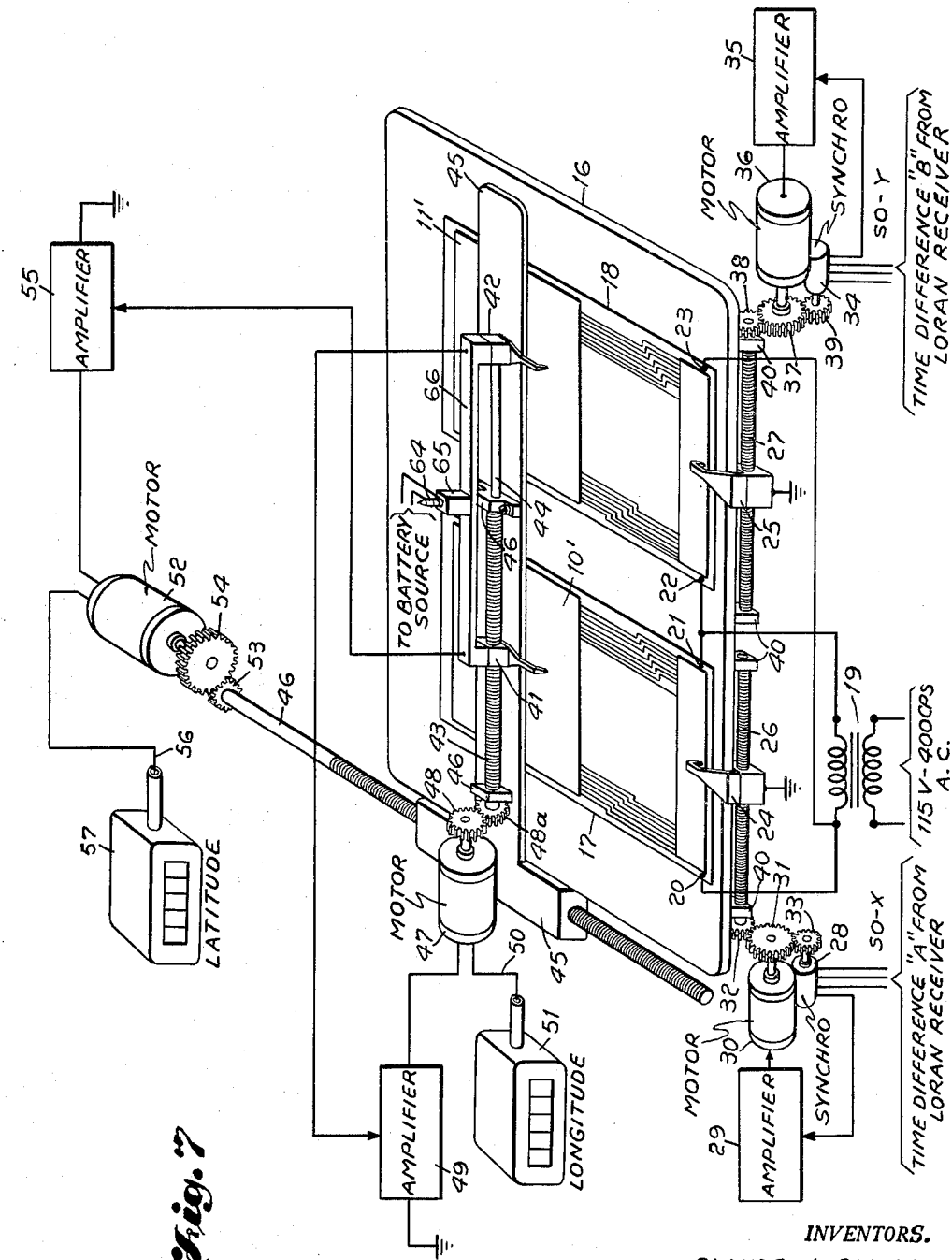

Aug. 17, 1965   C. J. PASQUIER ETAL   3,201,793
COORDINATE CONVERSION DEVICE
Filed June 20, 1962   6 Sheets-Sheet 6

INVENTORS.
CLAUDE J. PASQUIER
BY FREDRICK T. GUTMANN

ATTORNEY

United States Patent Office 3,201,793
Patented Aug. 17, 1965

3,201,793
COORDINATE CONVERSION DEVICE
Claude J. Pasquier, New York, N.Y., and Fredrick T. Gutmann, West Caldwell, N.J., assignors to International Telephone and Telegraph Corporation, Nutley, N.J., a corporation of Maryland
Filed June 20, 1962, Ser. No. 203,941
10 Claims. (Cl. 343—112)

This invention relates to apparatus for continuous automatic conversion of one coordinate system into another.

While the description of this invention is based upon conversion of hyperbolic coordinates into latitude and longitude, it is equally applicable to other conversions, such as hyperbolic-to-polar coordinates, etc. Similarly, an inverse conversion may be accomplished by simply interchanging input and output. This invention will also permit direct two-dimensional recording of navigational input data thus obviating the need for chart plotters $x$–$y$ recorders and other auxiliary equipment.

The Loran system of navigation comprises broadly two pairs of spaced pulse transmitters, one transmitter of each pair having though, not necessarily the same location, and a receiver for the transmitter pulses with the necessary timing and indicating equipment at the point to be located. The difference in arrival time of corresponding pulses from each pair of transmitters is measured. With this information and information as to the time relation of the corresponding pulses from each pair of transmitters, a location may be established along two spherical hyperbolas having their foci at respective pairs of transmitters. The intersection of these hyperbolas will fix the position of the receiver.

In practice, charts of the area of interest are prepared having the family of spherical hyperbolas plotted thereon corresponding to each pair of transmitters. The hyperbolas are ordinarily chosen to correspond to a time difference in even hundred microsecond as measured thereon, and thus the spacing between adjacent hyperbolas of a family will correspond to an incremental time delay of 100 microseconds. Using these charts, the navigator at the receiver has only to measure the arrival time difference of the corresponding pulses from each pair of transmitters, and then determine the receiver position by interpolating the distance between the two adjacent hyperbolas of each family nearest to the measured arrival time difference for that family. At times whose intervals are determined by the speed of the ship measurements may be taken, and locations corresponding thereto determined on the charts to permit a track of the ship to be plotted thereon. While this procedure is routine, there will obviously be some delay between the time of taking the measurements and the determination of the position. As crafts' speed become much faster, this delay becomes troublesome, and it is desirable to devise some system whereby this delay can be eliminated.

An object of this invention is to provide a system for fast, continuous and automatic conversion of one coordinate system into another.

A further object is to provide a system for fast conversion of Loran hyperbolic coordinates into latitude and longitude or polar coordinates and to provide a continuous track of navigating craft.

A feature of this invention is a coordinate conversion device for a Loran receiver to convert first and second time difference signals indicative of hyperbolic coordinates and representing the position of an object to a different coordinate system comprising first and second families of hyperbolic lines, and including means to translate said first and second time difference signal to the related hyperbolic lines of said first and second families, respectively, and means coupled to the conductive lines to translate the time difference signals to signals indicative of the position of the object in a different coordinate system.

Figure 2:
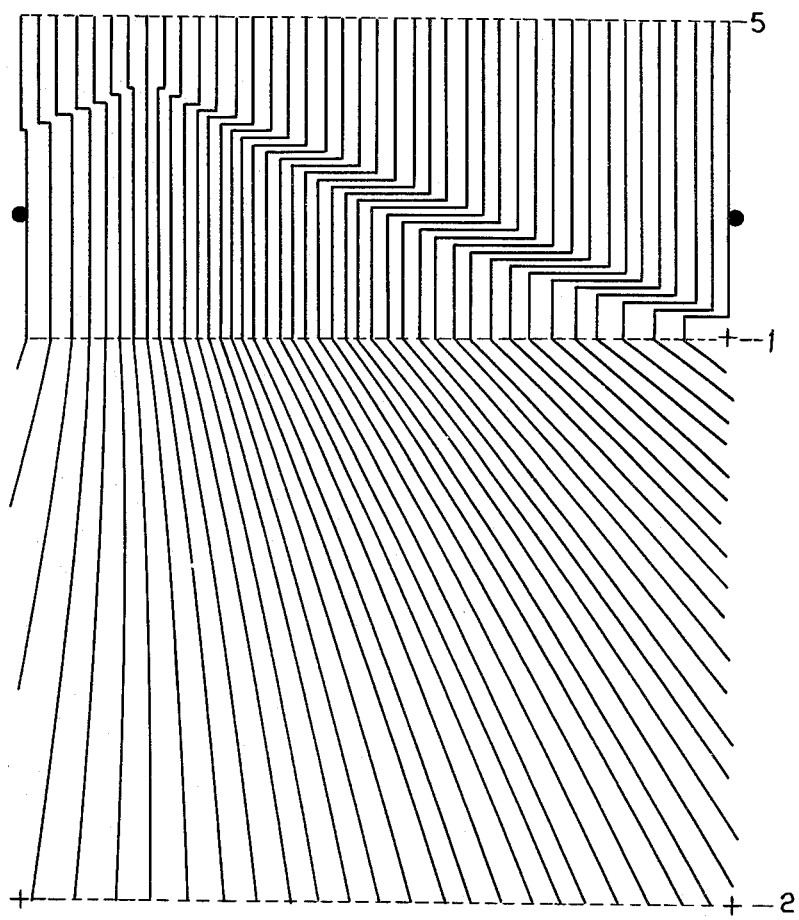
Figure 6:
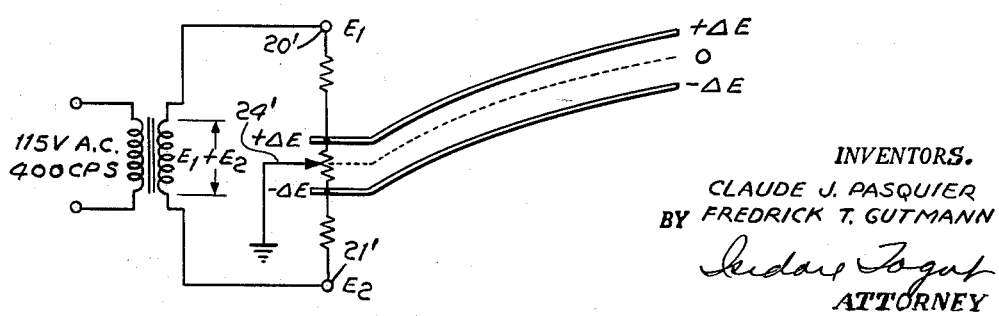
Figure 8:
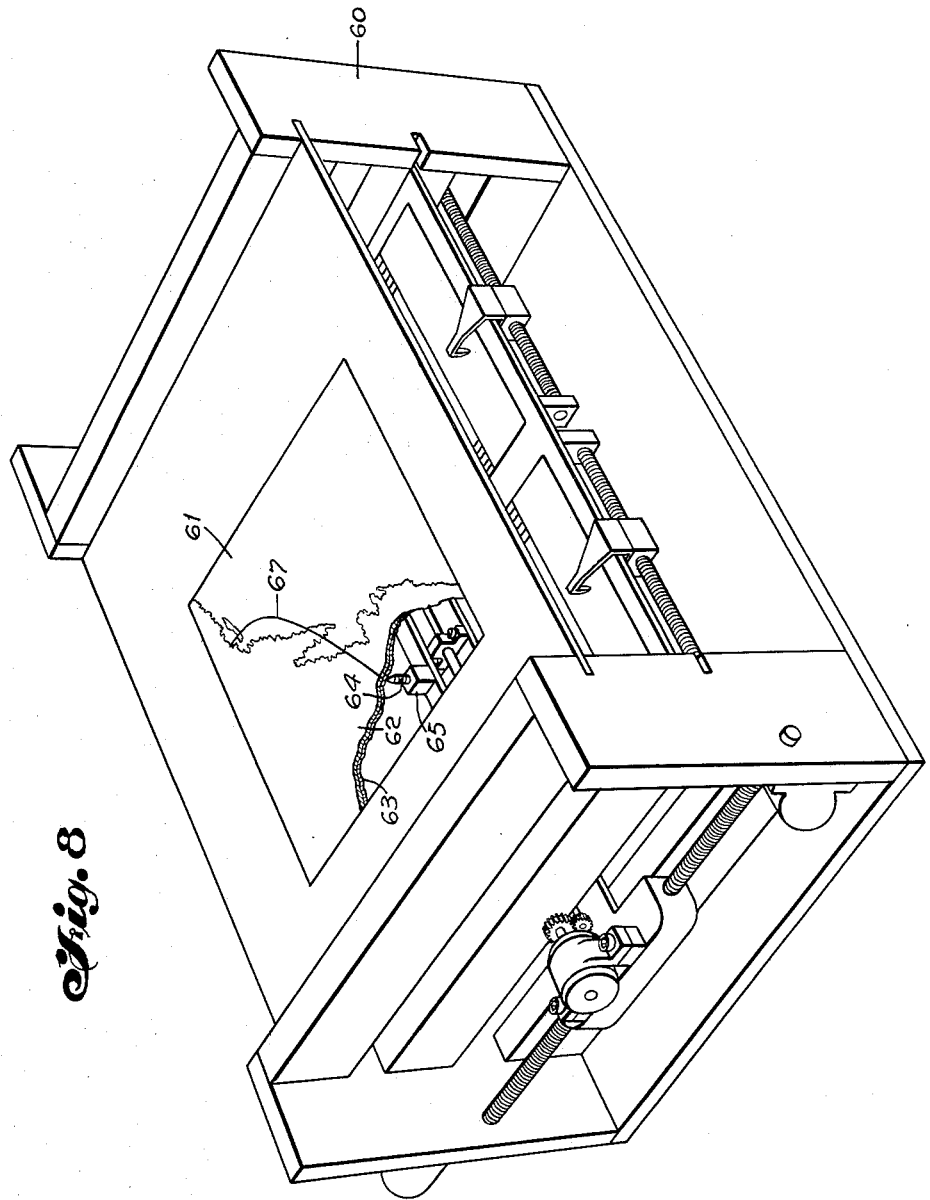

The above-mentioned and other features and objects of this invention will become more apparent by reference to the following description taken in conjunction with the accompanying drawings, in which:

FIG. 1 is a portion of a Loran chart;
FIG. 2 is a first station pair of Loran hyperbolic lines extended to linear scale;
FIG. 3 is a second station pair of Loran hyperbolic lines extended to linear scale;
FIG. 4 is the map of FIG. 2 treated with resistive material;
FIG. 5 is the map of FIG. 3 treated with resistive material;
FIG. 6 is an embodiment of this invention;
FIG. 7 is a schematic useful in describing the operation of this invention; and
FIG. 8 is the embodiment of FIG. 6 further including a map for projection of the tracking output.

Hyperbolic navigation system have long suffered from the fact that position information is rendered in terms of time difference readings which then require conversion to another set of position coordinates. Whereas the early Loran-A navigation system did not impose an undue burden upon the navigator, the newer automatic systems, such as Loran-B, Loran-C and Omega have opened an era where the continuous flow of hyperbolic position information cannot be efficiently utilized by a navigator using the usual chart conversion techniques.

The desirability of continuous conversion from hyperbolic coordinates to rectangular coordinates, whether they be latitude-longitude or steering information, has been amply demonstrated by the eagerness with which the military services have utilized computers for coordinate transformation. While these equipments may have a high degree of precision, both the analog and digital approaches inevitably result in a highly complex machine with attendant reduced reliability, substantial weight and high cost. The instant device combines coordinate conversion with pilot display presentation upon an undistorted map. It thus provides a continuous permanent record of aircraft track available for record purposes. Continuous position information will be seen at a glance in a form directly applicable to the pilot's frame of reference. In contrast with left-right and distance indicators, the continuous plot will present rates as well as position information to the pilot. The device will accept other navigational inputs, such as inertial or doppler, with no modifications to the basic equipment.

With reference to FIG. 1, there is shown a portion of a Loran-C map of the Carribean area extending from north latitude 14° to 30° and west longitude 51° to 79°. Station pairs SO–X and SO–Y provide the hyperbolic lines required to define completely and unambiguously any position within the area. It is recognized that work involved in plotting Loran lines upon the chart was considerable and required hundreds of hours of digital computer time. The basic method of this invention makes use of an electrical replica of the Loran-C map wherein physical displacements bear a direct undistorted relationship to the motion of the aircraft within the coverage area. Two electromechanical servo repeaters as will be shown later on carry Loran-C information to the electrical map and two null seeking servos resolve the Loran data into rectangular coordinate components, such as latitude-longitude or northing and easting. With reference to FIGS. 2, 3, 4 and 5, the construction of the electrical map will be described. A plastic overlay of the Loran chart is made by reproducing conductive lines following the Loran lines of one pair of stations upon an insulating board, in this case SO-X, as shown within the limits of the broken lines marked 1 and 2 on FIG. 2 and SO-Y as shown within the limits of the broken lines 3 and 4 in FIG. 3. The conductive lines spaced in equal Loran increments, such as 100 microseconds, are brought out to the edge of the overlay where they are extended to form the linear scale of hyperbolic coordinates as shown by the broken lines 5 in FIG. 2 and 6 in FIG. 3. FIGS. 4 and 5 show the finished boards for the SO-X and SO-Y coordinates. The conductive lines may be applied by conventional printed circuit techniques or any other suitable method. A coating of plastic conductive material is applied to the map area 10 in FIG. 4 and 11 in FIG. 5 and to the areas 12 and 13 covering the linear hyperbolic scales. This in effect forms for each station pair board a two-dimensional potentiometer. The conductive plastic forms a hard smooth surface over the conductive copper hyperbolic lines and the sensitivity of the material is chosen at about 500 ohms per square inch. A suitable material for this purpose is a conductive epoxy resin. The dielectric boards 14 and 15 may be any suitable plastic used for printed circuitry purposes. The electrical map is then completed by bonding the two boards together in side-by-side relationship with the active surfaces of the conductive material exposed.

FIG. 7 shows the complete coordinate translator mechanism. Instead of two boards, a single dielectric board is shown on top of which are printed the map areas of the hyperbolic line for SO-X and SO-Y. The SO-X portion of the complete map is shown at 17 and the SO-Y portion is at 18. Alternating current is applied through a transformer 19 from a source of A.C. current to each board at the points 20, 21, 22 and 23. Since these points are connected to the outermost linear hyperbolic Loran lines, a voltage gradient exists across each board. Sliders 24 and 25 are now mounted to travel over the conductive areas of the linear hyperbolic lines of board 17 and 18, respectively. Each of the sliders is connected to ground so that the exact position of each slider is effectively carried into the map along a line of zero potential. The two sliders 24 and 25 are servo driven along lead screws 26 and 27, respectively, by time difference signals which are the output of synchros from the Loran receiver. The time difference SO-X signals from the synchro (not shown) in the Loran receiver is coupled to synchro 28, the output of which is fed through amplifier 29 to motor 30 which is geared via gears 31 and 32 to the lead screw 26 to move slider 24 along the conductive surface of board 17 in response to the time difference signals. The synchro 28 shaft is also geared to the motor gear 31 via gear 33. Since the output of synchro 28 would have insufficient power to drive the slider 24, it is necessary to have the motor 30 provide the necessary power to do it. Likewise, the time difference signals SO-Y from a synchro (not shown) in the Loran receiver is coupled to synchro 34, the output of which is fed via amplifier 35 to motor 36 which drives the lead screw 27 via gears 37 and 38. The shaft of synchro 34 is coupled via gear 39 to the motor gear 37. Thus the slider 25 is moved along the conductive surface covering the linear hyperbolic lines of board 18. The lead screws 26 and 27 are supported from the table 16 by means of journals 40.

What has been described before is the input mechanism wherein Loran inputs are generated by producing the line of zero potential along each side of the electrical map on board 16. As heretofore explained, the bottom portion of each board represents a linear scale of hyperbolic numbers. In other words, a linear displacement over the edge of the scale will represent a linear change in value of Loran numbers. With reference to FIG. 6, we assume a 400 c.p.s. transformer is connected between the two outermost lines 20' and 21' as for the map 17. If the wiping slider 24' connected to ground is then made to travel over the narrow conductive track covering the linear hyperbolic scale, a line of zero A.C. potential will then be carried into the map area, and that line will follow precisely the shape of the hyperbolic lines surrounding it. It is not necessary for the slider 24' to stop precisely over a copper hyperbolic line because the conductive material acts as an interpolator. This is illustrated as follows in FIG. 6. The potentiometer shown between the voltages E1 and E2 is formed by the resistive material both at the hyperbolic input and over the map area. Since the transformer's ground return is made only through the slider 24', voltages E1 and E2 will be a function of slider position, but the lines on either side of the slider will have plus and minus A.C. voltages produced by the requirement of zero potential at the exact point of contact of the slider. These voltages will then exist along the copper line into the map area because the copper is a much better conductor than the resistive material. Thus the zero potential line will continue between the lines in the same physical relationship as that of the slider to the hyperbolic scale taps. It must be emphasized at this point that overall electrical linearity of the entire output track is not important as long as the linearity between two adjacent lines is good; this is brought about by the fact that interpolation is only carried out between two exact lines. Also, the tap effect, which can best be described as the generation of a dead zone due to line thickness, is greatly reduced by the filling and covering effect of the resistive coating. It is thus seen that the input circuit consists of a servo driven slider actuated by the Loran information obtained from the navigation receiver (not shown).

The output mechanism will now be described with reference to FIG. 7. As stated above, the Loran inputs are generated by producing the line of zero potential along each side of the electrical map. The intersection of the two zero potential lines is the point corresponding to the position of the craft, and the output mechanism automatically seeks and tracks this point. The output mechanism consists of two pickoffs 41 and 42 in exact fixed registry, each sensing one side of the electrical map. The two pickoffs 41 and 42 are constrained to move together in any direction but are electrically insulated from each other. Pickoff 41 is coupled to a lead screw 43 and pickoff 42 is coupled to shaft 44 which slides within the lead screw 43 so that the two pickoffs 41 and 42 will move together with the distance between the two pickoffs 41 and 42 maintained constant. Lead screw 43 is mounted on platform 45 by means of journal bearings 46. The platform 45 is part of a carriage which travels along lead screw 46, the axis of which is perpendicular to the axis of lead screw 43. Lead screw 43 is coupled to the motor 47 by gears 48 and 48a. The motor 47 is driven via amplifier 49 from the electrical current picked up by pickoff 42 as it travels over the conductive surface 11' covering the hyperbolic lines of map 18. The shaft rotation of motor 47 is also coupled via line 50 to a longitude counter 51. In a similar manner, lead screw 46 is coupled to motor 52 via gears 53 and 54. Motor 52 is driven via amplifier 55 from the current generated by pickoff 41 as it travels over the conductive surface 10' covering the hyperbolic lines of the map area 17. The shaft rotation of motor 52 is coupled via coupling 56 to a latitude counter 57. If we assume now that the SO-X pickoff output 41 is used to drive the carriage in a north-south direction and the SO-Y pickoff output 42 is used to drive the carriage in the east-west motion, then the dual pickoffs will converge upon the intersection of two zero potential lines and the indicated position will correspond exactly to that of the aircraft over the Loran maps. The Loran map used in this discussion uses a Mercator projection wherein linear motion along the east-west direction is exactly proportional to longitude. Latitude, on the other hand, suffers the usual distortion. The counter 51 on the east-west servo will then indicate longitude exactly. The problem of latitude remote readout from the counter 57 may be solved by predistortion of the Loran map, a fairly simple matter in medium latitude, or at extreme latitudes up to the pole, a grid system may be used to great advantage. In any case, the pictorial display feature of this invention does not require special maps because whatever map was used for the electrical map is also used in the display. In this fashion, Mercator, Lambert conformal projections may be used as desired and the moving index will plot the correct track as dictated by the Loran inputs. As shown in FIG. 8, the map in Mercator or any projection used for the Loran map is disposed over the electrical map and the pickoffs.

The complete mechanism shown in FIG. 7 is mounted in a housing 60 disposed above the electrical map and the pickoff is mounted on the geographical map 61 of the area in which the craft is navigating. The geographical map preferably is mounted or traced on transparent plastic or glass 62, as may be desired which is shown partially broken away. On the bottom surface of the glass transparent map is placed a paper, such as Thermofax 63 (the thickness of which is shown somewhat exaggerated), on which lines can be traced with a heated point. A hot stylus 64 disposed in a holder 65 is fastened on the member 66 connecting the pickoffs 41 and 42. A current from a source (not shown) is connected to the stylus for heating thereof. The stylus is so placed that the tip thereof will contact the heat susceptible paper disposed underneath the transparent map 62 and thus as the pickoffs move over the electrical map the stylus will follow and record the successive positions of the craft as a continuous tracking line 67, which is the course of the craft. At the conclusion of the voyage the heat susceptible paper can be removed and another inserted. Also if a different map area is desired, the map 62 can be removed from the housing 60 and another map area inserted.

While we have described above the principles of our invention in connection with specific apparatus, it is to be clearly understood that this description is made only by way of example and not as a limitation to the scope of our invention as set forth in the objects thereof and in the accompanying claims.

We claim:

1. A coordinate conversion device for a Loran receiver to convert first and second time difference signals indicative of hyperbolic coordinates and representing the position of an object to a different coordinates system comprising, first and second dielectric members,
   first and second families of conductive hyperbolic lines,
   means disposing said first and second families of conductive hyperbolic lines on said first and second dielectric members respectively, said conductive hyperbolic lines being extended to the edge of said dielectric members in a linear scale of hyperbolic coordinates, the coordinate lines in said linear scale being parallel,
   means disposing said first and second dielectric members in side-by-side relation,
   means to translate said first and second time difference signals to the related hyperbolic lines of said first and second families respectively,
   and means coupled to said conductive lines to translate said time difference signals to signals indicative of the position of the object in a different coordinate system.

2. A coordinate conversion device according to claim 1 further comprising
   resistive material disposed over said conductive hyperbolic lines,
   a source of electric energy,
   means for coupling said energy to the conductive lines of each said dielectric member so that a potential difference exists across said conductive lines.

3. A coordinate conversion device for a Loran receiver to convert first and second time difference signals indicative of hyperbolic coordinates and representing the position of an object to a different coordinate system comprising, first and second members of dielectric material,
   first and second families of conductive hyperbolic lines,
   means disposing said first and second families of conductive hyperbolic lines on said first and second supporting members respectively, said hyperbolic conductive lines being extended to one edge of each said supporting member in a linear scale of hyperbolic coordinates, the coordinate lines in said linear scale being parallel,
   means disposing said first and second dielectric members in side-by-side relation,
   a resistive material disposed over said conductive hyperbolic lines and said extended lines of said linear scale,
   a source of electric energy,
   means coupling said energy to the conductive lines of each member so that a potential difference exists across the conductive lines of each said member,
   first and second contact members adapted to move respectively over the extended line of said first and second members respectively and coupled to a point of zero potential,
   means responsive to the first and second time difference signals to cause said first and second contact members to move over said extended conductive lines,
   and means responsive to said movement of said contact members to derive the position of said object in a different coordinate system.

4. A coordinate conversion device for a Loran receiver to convert first and second time difference signals indicative of hyperbolic coordinates and representing the position of an object to a different coordinate system comprising, first and second members of dielectric material,
   first and second families of conductive hyperbolic lines,
   means disposing said first and second families of conductive hyperbolic lines on said first and second dielectric members respectively,
   said hyperbolic conductive lines being extended to one edge of each said dielectric member in a linear scale of hyperbolic coordinates,
   a resistive material disposed over said conductive hyperbolic lines and said extended lines of said linear scale,
   a source of electric energy,
   means coupling said energy to the conductive lines of each member so that a potential difference exists across the conductive lines of each said member,
   first and second contact members adapted to move respectively over the extended lines of said first and second members respectively and coupled to a point of zero potential,
   means responsive to the first and second time difference signals to cause said first and second contact members to move over said extended conductive lines,
   third and fourth contact members adapted to move over said conductive hyperbolic lines in response to said movement of said first and second contact members,
   and means responsive to the position assumed by said third and fourth contact members to indicate the position of said craft in a different coordinate system.

5. A coordinate conversion device for a Loran receiver according to claim 4 wherein said third and fourth contact members are spaced apart and are coupled together to move in unison over the conductive hyperbolic coordinate lines of said first and second dielectric members respectively.

6. A coordinate conversion device according to claim 5 further comprising
   first motive means coupled to said third and fourth contact members to move said third and fourth contact members in a first direction and second motive means coupled to said third and fourth contact members to move said third and fourth contact members in a second direction, said movements in said first and second directions indicating the movement of said craft in said different coordinate system.

7. A coordinate conversion device for a Loran receiver to convert first and second time difference signals indicative of hyperbolic coordinates and representing the position of an object to a Cartesian coordinate system comprising, first and second members of dielectric material,
first and second families of conductive hyperbolic lines,
means disposing said first and second families of conductive hyperbolic lines on said first and second dielectric members respectively,
said hyperbolic conductive lines being extended to one edge of each said dielectric member in a linear scale of hyperbolic coordinates,
a resistive material disposed over said conductive hyperbolic lines and said extended lines of said linear scale,
a source of electric energy,
means coupling said energy to the conductive lines of each member so that a potential difference exists across the conductive lines of each said member,
first and second contact members adapted to move respectively over the extended lines of said first and second members respectively and coupled to a point of zero potential,
means responsive to the first and second time difference signals to cause said first and second contact members to move over said extended conductive lines,
third and fourth contact members adapted to move over said conductive hyperbolic lines in response to said movement of said first and second contact members and means responsive to the position assumed by said third and fourth contact members to indicate the position of said craft in a different coordinate system,
said third and fourth contact members being spaced apart and coupled together to move in unison over the conductive hyperbolic coordinate line of said first and second dielectric members respectively,
first motive means coupled to said third and fourth contact members to move said third and fourth contact members in a first direction
and second motive means coupled to said third and fourth contact members to move said third and fourth contact members in a second direction,
said movements in said first and second directions indicating the movement of said craft in said Cartesian coordinate system.

8. A course tracking device for a Loran receiver comprising means to convert said first and second time difference signals indicative of hyperbolic coordinates and representing the position of an object to a different coordinate system,
first and second members of dielectric material,
first and second families of conductive hyperbolic lines,
means disposing said first and second families of conductive hyperbolic lines on said first and second dielectric members respectively,
said hyperbolic conductive lines being extended to one edge of each said dielectric member in a linear scale of hyperbolic coordinates,
a resistive material disposed over said conductive hyperbolic lines and said extended lines of said linear scale,
a source of electric energy,
means coupling said energy to the conductive lines of each member so that a potential difference exists across the conductive lines of each said member,
first and second contact members adapted to move in all respectively over the extended lines of said first and second members respectively and coupled to a point of zero potential,
means responsive to the first and second time difference signals to cause said first and second contact members to move over said extended conductive lines,
third and fourth contact members adapted to move over said conductive hyperbolic lines in response to said movement of said first and second contact members and means responsive to the position assumed by said third and fourth contact members to indicate the position of said craft in said different coordinate system,
a transparent map of the area traveled by the object in said different coordinates, a sheet of recording material disposed on one surface of said transparent map,
a stylus coupled to said third and fourth contact members and adapted to move in unison with the movement of said third and fourth contact members and to contact said recording sheet during said movement whereby said stylus marks on said recording sheet the path of said movement,
said path representing the track of said object as it moves through the area represented by said map.

9. A course tracking device for a Loran receiver according to claim 8 wherein said sheet of recording material is heat responsive, and said stylus comprises means for heating said stylus in response to a source of energy.

10. A printed circuit map for Loran hyperbolic coordinates comprising first and second flat members of dielectric material,
each said member carrying on one surface thereof a plurality of conductive lines, said conductive lines being disposed on one portion of said member in the form of a family of Loran hyperbolic lines,
said conductive lines being extended to cover another portion of said member, said extended lines forming a linear scale of said hyperbolic coordinates, said extended lines being parallel,
a layer of resistive material disposed over said hyperbolic conductive lines and said extended lines of said linear scale,
means disposing said first and second members in side-by-side relationship,
said first and second flat members providing first and second time difference Loran hyperbolic coordinates for plotting the position of an object.

References Cited by the Examiner

FOREIGN PATENTS 133,606    11/51    Sweden _____ 343—112

CHESTER L. JUSTUS, *Primary Examiner.*
DAVID G. REDINBAUGH, *Examiner.*